United States Patent
Ooki et al.

(12) 
(10) Patent No.: US 6,396,044 B1
(45) Date of Patent: May 28, 2002

(54) IMAGE READING APPARATUS

(76) Inventors: Hiroya Ooki, c/o NEC Engineering, Ltd., 18-21, Shibaura 3-chome, Minato-ku; Tetsuichirou Yamamoto; Kouji Nakahara, both of c/o NEC Corporation, 7-1, Shiba 5-chome, Minato-ku, all of Tokyo (JP)

( * ) Notice: Subject to any disclaimer, the term of this patent is extended or adjusted under 35 U.S.C. 154(b) by 0 days.

(21) Appl. No.: 09/468,523

(22) Filed: Dec. 21, 1999

(30) Foreign Application Priority Data

Dec. 22, 1998 (JP) .............................. 10-365545

(51) Int. Cl.[7] .................. H01J 10/14; H04N 1/028
(52) U.S. Cl. .................... 250/208.1; 358/474
(58) Field of Search ............... 250/208.1; 358/474, 358/475, 493, 494, 496

(56) References Cited

U.S. PATENT DOCUMENTS 5,902,993 A * 5/1999 Okushiba et al. ........ 250/208.1

FOREIGN PATENT DOCUMENTS

| JP | 56-87377 | 7/1981 |
|----|----------|--------|
| JP | 1-176953 | 12/1989 |
| JP | 2-131068 | 5/1990 |
| JP | 8-207352 | 8/1996 |
| JP | 9-200432 | 7/1997 |
| TW | 342455 | 10/1998 |

* cited by examiner

*Primary Examiner*—Stephone Allen
(74) *Attorney, Agent, or Firm*—Dickstein Shapiro Morin & Oshinsky LLP

(57) ABSTRACT

To achieve a reduction in the cost of components and a reduction in assembly steps in a production line, the number of parts is reduced in an image reading apparatus. An image reading apparatus includes a casing which is provided with a unit to which light reflected from an original document surface is incident, a lens for converging the reflected light, an image sensor to which the reflected light which has been converged by the lens is incident, and a plurality of reflectors disposed between the light incident unit and the lens for defining an optical path for the reflected light. The reflectors are formed on the inner surface of the casing in a plurality of positions by vacuum depositing aluminum on the inner surface.

8 Claims, 3 Drawing Sheets

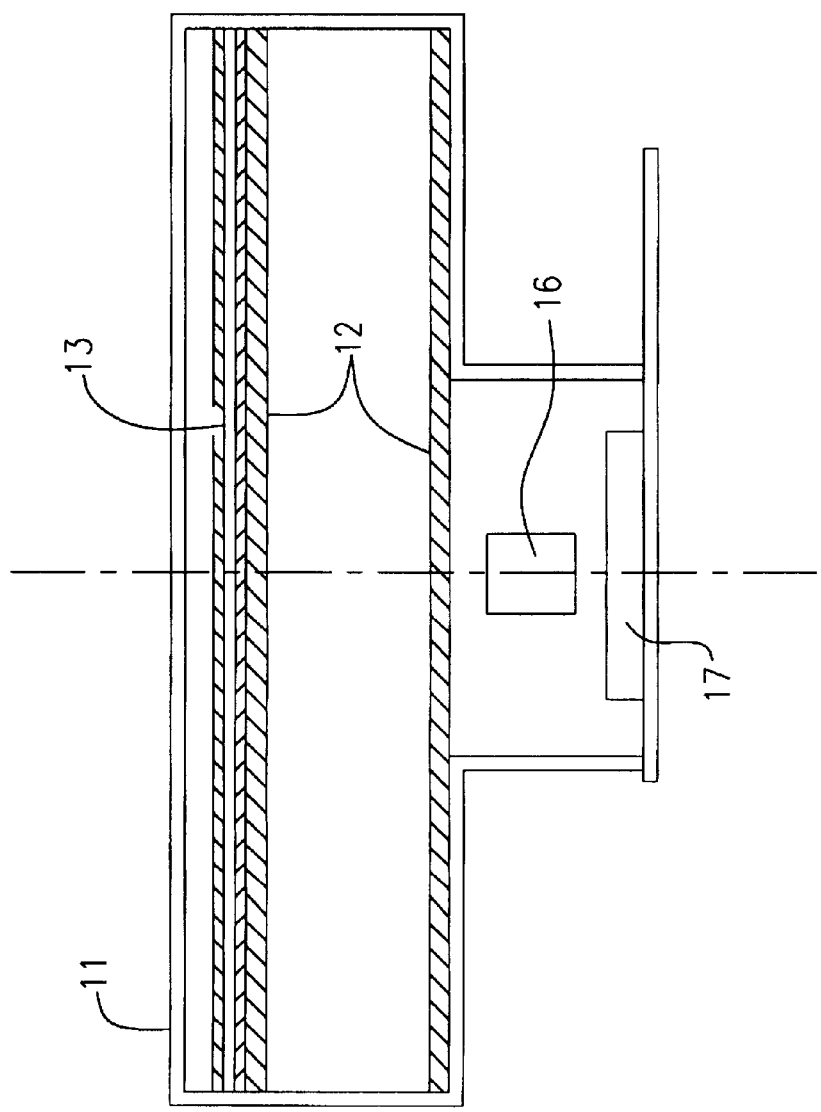
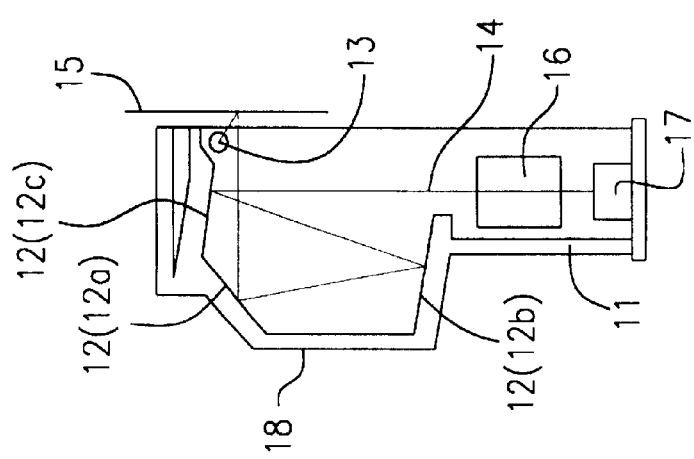
FIG. 1b
FIG. 1a

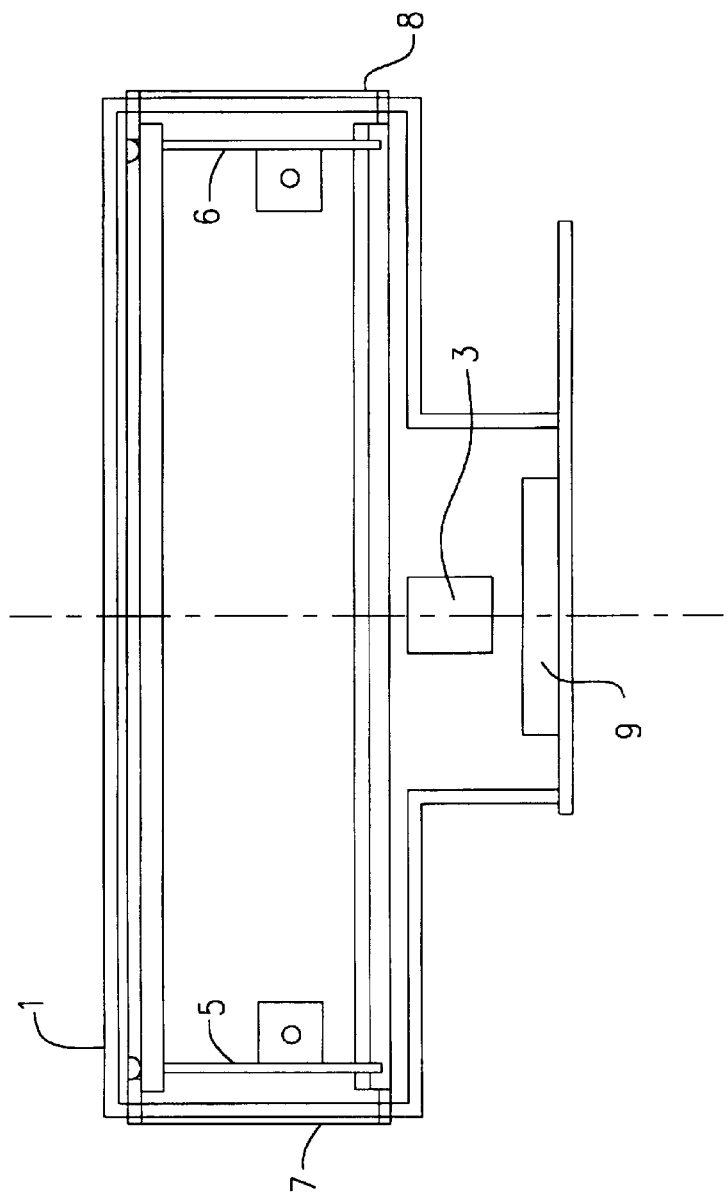
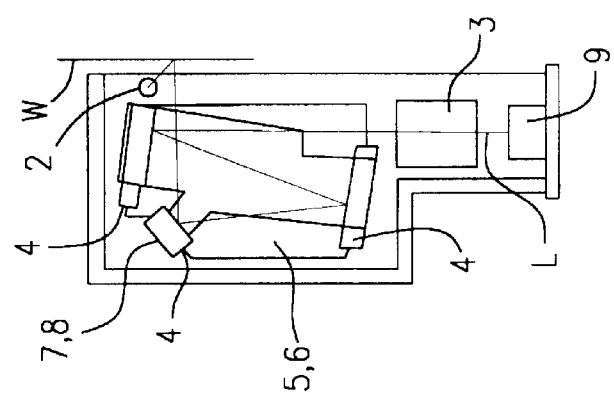
FIG. 3b
(PRIOR ART)
FIG. 3a
(PRIOR ART)

IMAGE READING APPARATUS

FIELD OF THE INVENTION

The present invention relates to an image reading apparatus such as a hand-held scanner.

BACKGROUND OF THE INVENTION

An image or document reading apparatus such as a handy scanner using a compact optical system including, for example, a CCD (Charge Coupled Device) image sensor requires an extended optical path between an original document surface and the CCD image sensor for focusing the image on a small CCD image sensor by means of lenses. Accordingly, an extended long optical path is formed by enabling the optical system housed in a small casing to reflect light a number of times.

An exemplary structure as shown in FIG. 3 is known. The image reading apparatus comprises a casing 1, a lamp 2 for illuminating an original document surface W having images recorded thereon with light, a lens 3 for converging reflected light L which has been reflected on the original document surface W, a plurality of mirrors 4 (medium obtained by vacuum-depositing aluminum on a glass) for guiding the reflected light which has been reflected on the original document surface W while bending it, mirror mounting parts 5 (6) for mounting the mirror 4 on the casing 1, and a CCD image sensor 9 to which the reflected light which has been focussed by said lens 3 is directed.

The mirror mounting part 6 and mirror securing part 8 are disposed in a symmetrical manner with the mirror mounting part 5 and mirror securing part 7 around the vertical central axis as shown in FIG. 3(b).

SUMMARY OF THE DISCLOSURE

However, the prior art has problems which are described as follows:

Since the plurality of mirrors 4 are mounted within the casing 1 by means of mirror mounting parts 5 (6) and mirror securing parts 7 (8), there are provided a number of parts, resulting in an increased number of assembly steps and increased manufacturing cost.

Generally, the present invention has been achieved in view of the above mentioned problems of the prior art. It is an object of the present invention to provide an image reading apparatus which is capable of achieving reduction in cost of components and reduction in the number of assembly steps in a production line by reducing the number of components in the image reading apparatus.

Further, objects of the present invention will become apparent in light of the disclosure herein.

In order to accomplish the above-mentioned object, the image reading apparatus according to a first aspect of the present invention is characterized in that the apparatus comprises a casing which is provided with a unit to which light reflected from an original document surface having images recorded thereon is incident, a lens converging the reflected light, an image sensor to which the reflected light which has been converged by the lens is incident, and a plurality of reflectors disposed between the light incident unit and the lens for defining an optical path for the reflected light therebetween, the reflectors being formed on the inner surface of the casing in a plurality of posit ions thereof by vacuum depositing aluminum thereon.

The image reading apparatus according to a second aspect is characterized in that a bracing raised portion is formed at a part of the casing, the reflectors being formed on the inner surface of the raised portion by vacuum depositing aluminum thereon.

According to a third aspect of the present invention, the casing is made of a synthetic resin.

According to a fourth aspect of the present invention, the reflectors comprises a first reflector for reflecting the incident reflected light from the light incident unit in a direction which is substantially perpendicular to the incident direction, a second reflector for reflecting the reflected light from the first reflector in such a direction that a narrow angle is formed between the incident direction and reflecting direction, and a third reflector for reflecting the reflected light from the second reflector toward the lens.

According to a fifth aspect of the present invention, the portion of the casing is formed with the reflectors comprises a separately provided casing component.

According to a sixth aspect of the present invention, the casing component is screwed to the casing.

According to a seventh aspect of the present invention, the casing component is bonded to the casing.

According to an eighth aspect of the present invention, the image sensor comprises a CCD image sensor.

In the image reading apparatus, the mirrors may be formed directly on the inner surface of the casing by vacuum depositing aluminum thereon in position. This eliminates the necessity of special mounting parts, resulting in that reduction in the manufacturing cost can be achieved by reducing the number of parts and the number of assembly steps, and reduction in the size of the apparatus can be achieved.

BRIEF DESCRIPTION OF THE DRAWINGS

FIGS. 1(a) and 1(b) are longitudinal sectional and bottom elevational views showing one embodiment of the present invention.

FIGS. 3(a) and 3(b) are longitudinal sectional and bottom views, respectively, showing a prior art scanner.

PREFERRED EMBODIMENTS OF THE INVENTION

Figure 2:
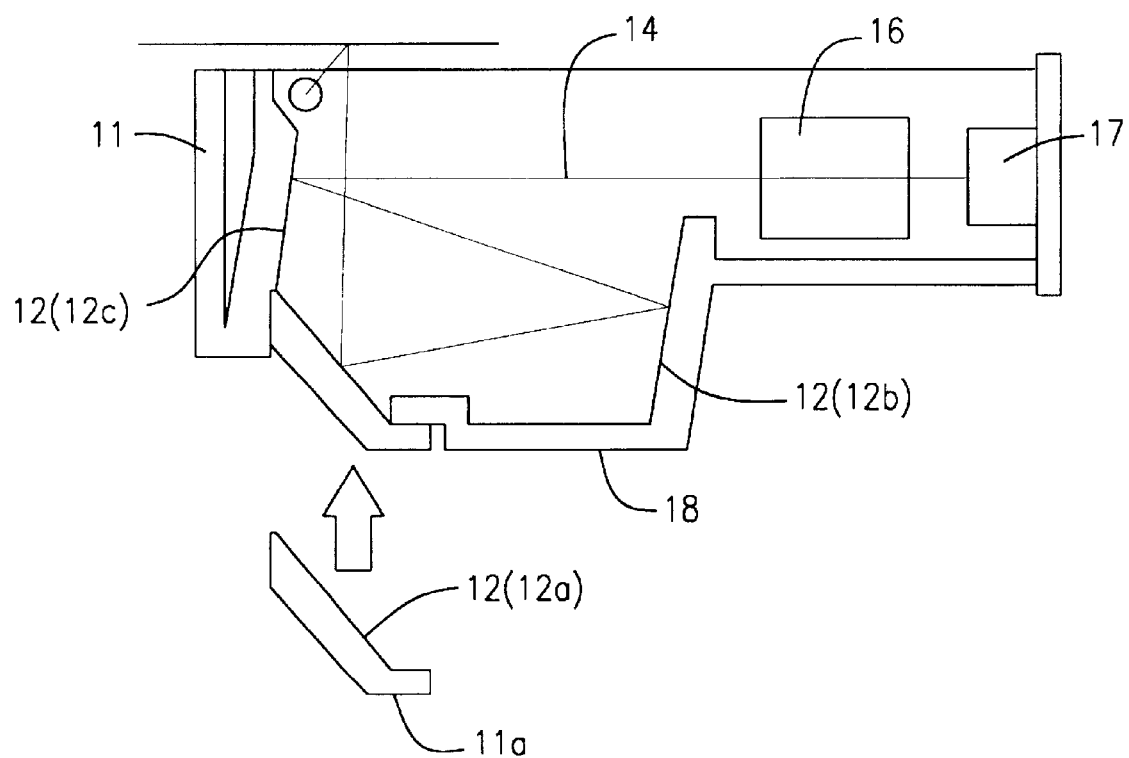
FIG. 2 is a longitudinal sectional view showing another embodiment of the present invention.

Now, an embodiment of the present invention will be described with reference to FIG. 1.

As shown in FIG. 1, an image reading apparatus in the present embodiment comprises a casing 11 which is provided with a unit to which reflected light 14 from an original document surface 15 having recorded images thereon is incident; a lamp 13 within the casing for illuminating the original document surface 15 with light; a lens 16 within the casing 11 for converging the reflected light 14; an image sensor 17 such as CCD image sensor to which the reflected light 14 which has been converged by the lens 16 is incident; and a plurality of reflectors 12 disposed between the light incident unit and the lens 16 for defining an optical path for the reflected light 14 therebetween. The reflectors 12 are formed on an inner surface of the casing 11 in a plurality of positions by vacuum depositing aluminum thereon.

Now, the details of the above-mentioned components will be described. In the present embodiment, the whole of the casing 11 is formed by, for example, injection molding of a synthetic resin. The casing 11 is provided with a bracing raised portion 18 in a position facing the light incident unit thereof. The reflectors 12 are formed by vacuum depositing aluminum on the inner surface of the raised portion 18 in position.

The reflected light 14 is incident into the casing 11 after being reflected on the original document surface 15 in a direction normal to the original document surface 15. The reflectors 12 comprises a first reflector 12a which receives reflected light 14 from the light incident unit in a direction which is substantially perpendicular to the incident direction, a second reflector 12b which reflects the reflected light 14 from the first reflector 12a in such a direction that a narrow angle is formed between the incident direction thereof and the reflecting direction thereof, and a third reflector 12c which reflects the reflected light 14 from the second reflector 12b towards the lens 16.

The casing 11 has an inner surface on which these reflectors 12 are formed and which is finished to as smooth as possible by using a molding which has been surface-finished with high precision and adjusting the molding conditions.

Since the casing 11 has mirror capabilities on a part of its inner surface in the thus formed image reading apparatus of the present embodiment, the necessity for mirrors and parts for securing the mirrors is omitted, unlike the prior art. Reduction in the number of steps for assembling the image reading apparatus and in the cost of components can be achieved.

The variation in mounting angle of the mirrors depend upon only the dimensional precision of the casing in the present embodiment, while those in the prior art depend upon the dimensional precision of the casing 11 and mirror mounting components and the precision of the assembly in a production line. The casing 11 having less variations in the mounting angle of the reflectors 12 can be stably manufactured by managing the precision of a mold for forming the casing 11 and the molding conditions.

For example, as shown in FIG. 2, the parts of the casing 11 which are to be provided with the reflectors may be formed of a casing component 11 a which is separately formed. This component 11a may be secured to the casing 11 by screwing or bonding.

For example, as shown in FIG. 2, the part of the casing 11 which are to be provided with the reflectors may be formed of a casing component 11a which is separately formed and this component 11a may be secured to the casing 11 by screwing or bonding.

Such a modification is effective when it is difficult to conduct a vacuum deposition of aluminum and fabrication of a mold for forming the casing due to structure of the casing 11.

In other words, since the casing 11 and the casing component 11a are made of a resin, the portions of the casing component 11a which are to be mounted on the casing 11 can be formed into the desired configuration. The casing component 11a may be of a form which is suitable for molding and vacuum deposition of aluminum.

The meritorious effects of the present invention are summarized as follows.

Since the present invention is configured as mentioned above, it provides the following advantages:

Since the casing has mirror capabilities on a part of its inner surface, the necessity for mirrors and parts for securing the mirrors can be omitted, unlike the prior art. Reduction in the number of steps for assembling the image reading apparatus and in the cost of components can be achieved.

The variations in the mounting angle of the mirrors depend upon only the dimensional precision of the casing in the present embodiment, while those in the prior art depend upon the dimensional precision of the casing and mirror mounting components and the precision of assembly in a production line. The casings have less variations in the mounting angle of the reflectors can be stably manufactured by managing the precision of a mold for forming the casing and molding conditions.

Since the inner surface of the casing 11 per se defines reflectors 12, a space which is necessary for mounting the reflectors can be saved, resulting in reduction in the size and weight of the apparatus.

It should be noted that other objects, features and aspects of the present invention will become apparent based on the entire disclosure and that modifications may be made without departing from the gist and scope of the present invention as disclosed herein and claimed as appended herewith.

Also it should be noted that any combination of the disclosed and/or claimed elements, matters and/or items may fall under the modifications aforementioned.

What is claimed is:

1. An image reading apparatus comprising:

a casing which is provided with a light incident unit to which light reflected from an original document surface having images recorded thereon is incident;

a lens for converging said reflected light;

an image sensor to which the reflected light which has been converged by said lens is incident; and a plurality of reflectors disposed between said light incident unit and said lens for defining an optical path for the reflected light therebetween, said casing forming a plurality of obliquely angled inner surfaces relative to the original document surface, and said reflectors being defined by and formed on the obliquely angled inner surfaces of said casing by vacuum depositing aluminum thereon.

2. An image reading apparatus as defined in claim 1, wherein a bracing raised portion is formed at a part of said casing, said reflectors being formed on the inner surface of said raised portion by vacuum-depositing aluminum thereon.

3. An image reading apparatus as defined in claim 1, wherein said casing is made of a synthetic resin.

4. An image reading apparatus as defined in claim 1, wherein said reflectors comprise a first reflector for reflecting the incident reflected light from the light incident unit in a direction which is substantially perpendicular to the incident direction, a second reflector for reflecting the reflected light from the first reflector in such a direction that a narrow angle is formed between the incident direction to the second reflector and reflecting direction from the second reflector, and a third reflector for reflecting the reflected light from the second reflector toward the lens.

5. An image reading apparatus as defined in claim 1 wherein the portion of said casing which is formed with said reflectors comprises a separately provided casing component.

6. An image reading apparatus as defined in claim 5, wherein said casing component is screwed to said casing.

7. An image reading apparatus as defined in claim 5, wherein in said casing component is bonded to said casing.

8. An image reading apparatus as defined in claim 1, wherein said image sensor comprises a CCD image sensor.

* * * * *